Oct. 30, 1951  C. R. PEARSON  2,573,054
DUMP RAKE

Filed June 16, 1949  2 SHEETS—SHEET 1

INVENTOR.
CHARLES R. PEARSON
BY

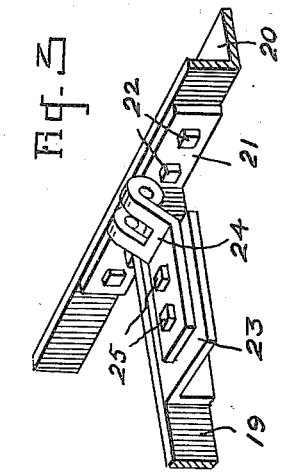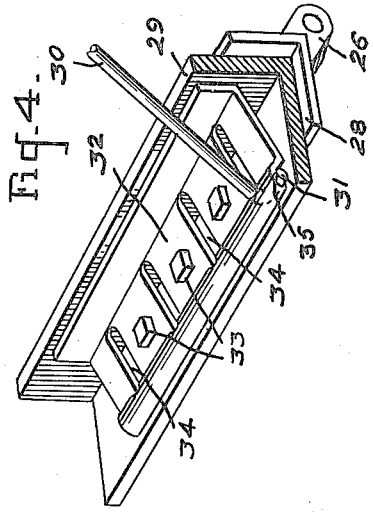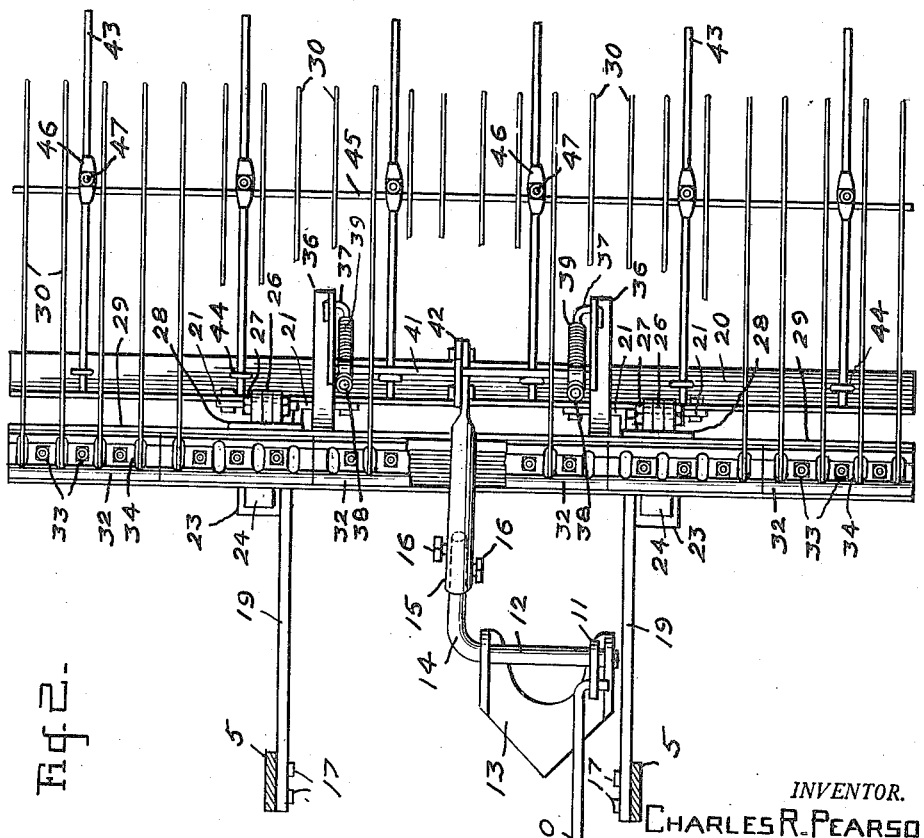

Patented Oct. 30, 1951

2,573,054

UNITED STATES PATENT OFFICE 2,573,054

DUMP RAKE

Charles R. Pearson, Newington, Va.

Application June 16, 1949, Serial No. 99,533

3 Claims. (Cl. 56—27)

This invention relates to improvements in dump rakes of the character used, particularly for raking hay into windrows.

Dump rakes of the character used heretofore, either for operation by a tractor or by other draft means, have involved the construction of an independent implement mounted separately from the tractor or draft means on mounting wheels. Such a construction has been not only complex and expensive to manufacture but also has been difficult of operation due to the fact that the operator could not manipulate or adjust the implement from his seat on the tractor.

Tractors have been provided heretofore with power lift devices operated by hydraulic means which function in response to the power plant of the tractor. However, in attaching a rake to a tractor of that character it has been customary merely to utilize the tractor as a draft device for the rake.

One object of this invention is to overcome the objections heretofore encountered in the use of conventional rakes, especially as have been provided for operation by a tractor having a power lift.

A further object of the invention is to simplify and improve the construction of a dump rake to enable it to be manufactured at relatively low cost and thereby sold at a reasonable price for the consumer which will nevertheless perform effectively the function of raking hay into the windrows with provisions for dumping the rake by the operation of the power lift of the tractor.

Still another object of the invention is to improve the construction of the dump rake whereby it may be operated as well as supported by the tractor, functioning in its dumping operation in response to operation of the mechanism of the power lift of the tractor to raise and lower the tines at suitable intervals according to the will of the operator.

These objects may be accomplished according to one embodiment of the invention by the provision of a supporting frame structure carried directly on the tractor to which is connected a tiltable support on which the tines are mounted. This tiltable support is operatively connected with the power lift on the tractor so as to function in response thereto for raising or lowering the tines at desired intervals according to the will of the operator. Suitable means is provided on the supporting frame structure to insure of clearing of the hay from the tines.

This embodiment is illustrated generally in the accompanying drawings in which

Fig. 2 is a top plan view of the dump rake showing the means of attachment to the tractor.

Fig. 3 is a detail perspective view of a hinge connection of the supporting member.

Fig. 4 is a similar view of a portion of the tine support.

Figure 1:
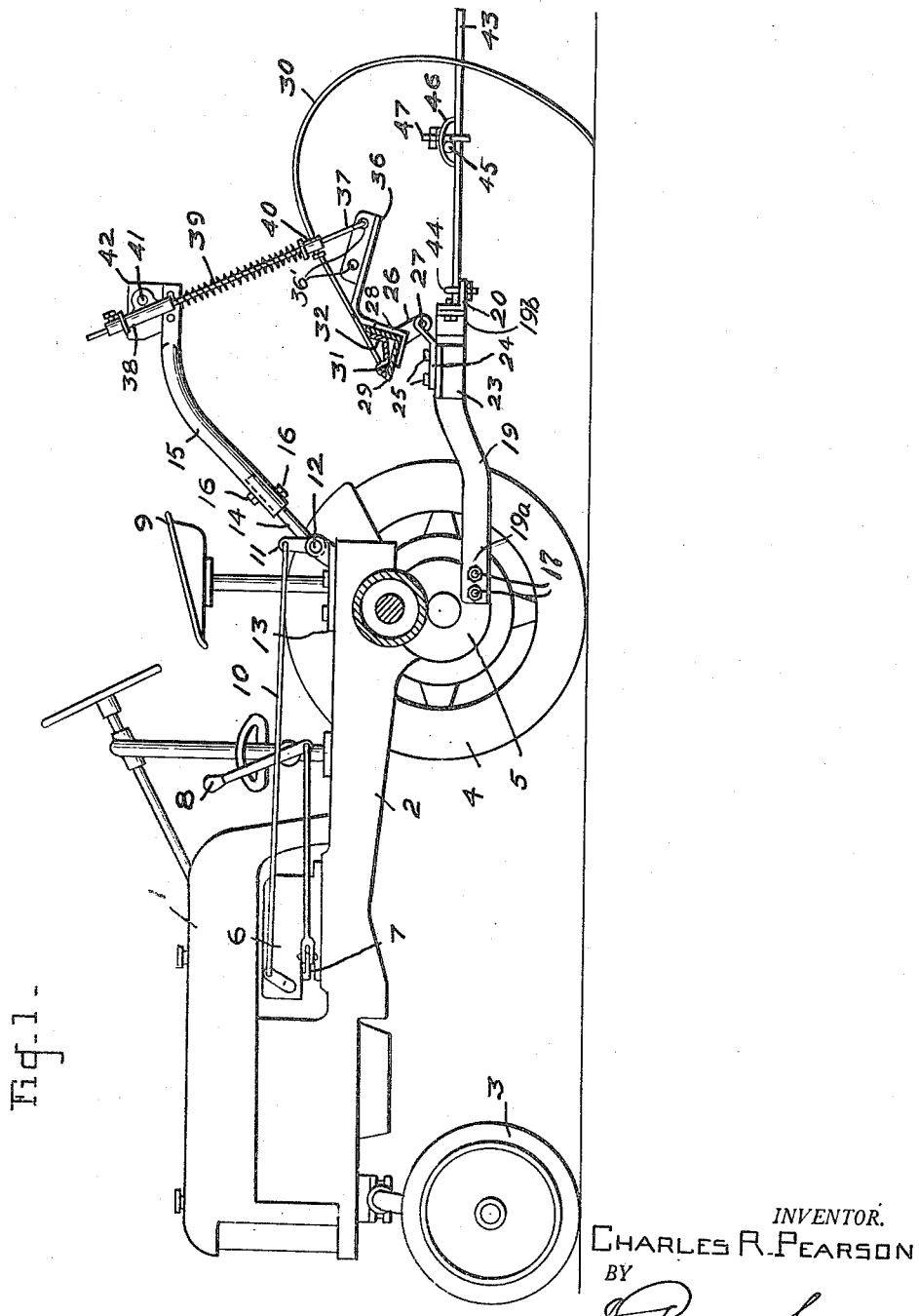
Fig. 1 is a side elevation of a tractor showing a dump rake attached thereto with a part of the tractor and rake broken away and in section.

The invention is shown in Fig. 1 as applied to a tractor of a conventional type merely for purpose of illustration and it will be understood that it is capable of use generally with any suitable power means although it is preferred that it be used with a tractor of the type having a power lift for manipulation and control of the rake. The tractor is designated generally by the numeral 1 and is shown as provided with a tractor frame 2 supported by front and rear wheels 3 and 4 respectively. The rear wheels are power driven through suitable transmission means not shown in detail but enclosed within a portion of the frame 2 and within a gear housing generally designated at 5 beside each of the rear wheels 4.

Also mounted on the tractor 1 is a hydraulic power device generally designated at 6 of a character well known in the art which need not be described in detail. Usually such hydraulic power device includes a cylinder having a piston mounted therein and operated by hydraulic pressure controlled by a suitable valve generally indicated at 7 capable of manipulation by means of a hand lever 8 mounted on the tractor in a convenient position for operation and control by the operator when on the seat 9 of the tractor.

The power device 6 shown is of the character adapted for operation of a power rod 10 which extends to an arm 11 upstanding from a cross shaft 12. The cross shaft 12 is journaled in upstanding ears on a mounting bracket 13 as shown also in Fig. 2, which bracket is secured rigidly upon the frame 2 of the tractor.

The cross shaft 12 upon which the arm 11 is fixed, also has an arm 14 secured rigidly thereto or turned laterally therefrom as shown in Fig. 2. Arm extension 15 is adjustably mounted on the arm 14 by machine screws 16 for detachably and adjustably securing the extension 15 on the arm 14.

The gear housing 5 is provided usually with a pair of spaced mounting bolts 17 projecting laterally from each of the housings 5 in position for engagement by draw bar means or mounting means of various implements that may be connected with the tractor. Secured rigidly by the mounting bolts 17 are draw bars 19, one for each wheel of the tractor as will be apparent from Figs. 1 and 2, the draw bars 19 being attached respectively at the forward ends 19a to the wheel housings 5 rigidly by the mounting bolts 17.

The rear end 19b of each draw bar 19 extends to a supporting frame member 20 to which both draw bars 19 are secured rigidly in longitudinally spaced relation as shown in Fig. 2. Any suitable means may be used for anchoring the draw bars 19 to the supporting member 20 but I have shown for purpose of illustration an anchoring bar 21 secured by bolts 22 to the supporting bar 20. The anchoring bar 21 in turn is secured rigidly to the draw bar 19 by being bolted, riveted, welded or otherwise fastened thereto.

A mounting bracket is shown at 23 permanently secured on one face of each of the draw bars 19 adjacent the supporting bar 20 and projecting laterally therefrom. A hinge member 24 is mounted upon the bracket 23 and is shown as secured thereto by bolts or other fastenings 25. Co-acting with the hinge member 24 is a second hinge member 26 in inter-fitting relation therewith and connected thereto by a hinge pin 27 so as to form a hinge connection with the supporting frame structure of the tractor. One such hinge structure is provided at each side of the longitudinal center of the tractor at or adjacent each of the draw bars 19 as shown in Fig. 2.

The hinge members 26 are connected with brackets 28 which cooperate to support a tine supporting member 29 mounted rigidly thereon and secured thereto as shown in Fig. 2. The member 29 is shown in the form of an angle bar although any suitable form of structure may be used as desired.

The tines are shown at 30 and may be of the usual character illustrated generally in the drawings although any suitable form thereof may be used as desired. Usually the tines 30 are formed of steel rods bent somewhat into semi-circular shape with sharpened lower ends to engage the ground while the opposite ends are adapted to be mounted on the supporting means of the rake. Said opposite ends are designated generally at 31 and are shown as pivotally mounted on the support member 29. Clip brackets are used for anchoring the tine ends 31 to the bar 29 as shown at 32, which brackets are held in place by bolts 33 for detachably mounting the brackets on the bar. While a separate bracket may be provided for each of the tines I have shown in Fig. 4 a form of bracket which secures four tines in place. This bracket is provided with slots 34 extending transversely thereof through which the tines extend, each of the slots extending to an under groove 35 in an edge portion of the bracket 32 in which the ends 31 of the tines are hingedly mounted.

Each of the brackets 28 has an outwardly extending arm 36 fixed thereto provided with a plurality of openings 36' therein for selective engagement by the lower end of a rod 37 extending upwardly therefrom through a guide 38. A coiled spring 39 is interposed between the guide member 38 and a stop 40 adjustably mounted on the rod 37 adjacent the lower end thereof normally tending to urge the rod downwardly with respect to the guide member 38, thereby tending to push downward resiliently on the connected arm 36.

The guide members 38 are mounted on a cross rod 41 connected intermediate its ends by a bracket 42 with the arm extension 15 as shown in Fig. 1.

It will be evident from this construction that the tines 30 are held by the support member 29 which latter is pivotally mounted at 27 on the stationary support member 20. When the hydraulic power device 6 is operated to shift the arm 14 and its extension 15 in a downward direction clockwise as viewed in Fig. 1 the arm extension 15 will act through the bracket 42 and cross rod 41 to urge the guide members 38 downward. These guide members 38 will compress the springs 39 thereby urging the rods 37 downward which in turn act on the arms 36 to swing the tine support member 29 in a clockwise direction about the pivots 27. This action will tend to urge the lower ends of the tines toward the ground in raking position when the rake is drawn over the surface and thereby accumulating within the rake a quantity of hay as desired.

When the device reaches the windrow and it is desired to dump the hay, the operator shifts the hand lever 8 and valve 7 in a direction to operate the power device 6. This power device acts through the rod 10 to swing the arm 11 and cross shaft 12 in a counter-clockwise direction as viewed in Fig. 1, thereby raising the arms 14 and their extensions 15. This action in turn will raise the rods 27 and pull upward on the arms 26 shifting the tine support 29 about the hinge pins 27 in a direction to raise the tines 30 from the ground to dump the hay contained in the rake.

Provision may be made as desired to insure of cleaning of tines from the hay by the provision of clearing rods 43 spaced at intervals along the rake as shown in Fig. 2. Each of the rods 43 extends rearwardly from the support member 20 to which it is anchored in any suitable manner at 44. I have shown an eye-bolt as a suitable form of anchoring means which will embrace the rod 43 and clamp it securely to the support member 20. The clearance rods 43 are shown as connected together by a cross rod 45 which is secured to the several clearance rods 43 by clamps 46 and bolts 47. Eye-bolts may be used for this purpose also and have been very effective in cooperation with the clips for anchoring these parts together.

This construction provides a dump rake of simple and inexpensive character which may be manufactured at low cost. It provides also for not only the supporting of the rake directly on the tractor but also the operation of the rake in dumping the hay directly by the power device on the tractor so as to insure of a positive and effective dumping action when desired as well as effecting raking of the hay when in use. The unit may be applied or detached readily from the tractor in a simple and unitary action.

While the invention has been illustrated and described in one embodiment it is recognized that variations and changes may be made therein without departing from the invention except as specified in the claims.

I claim:

1. A dump rake comprising a pair of elongated, laterally spaced and parallel draw bars having opposed ends, means detachably connecting one of the respective ends of said draw bars with a traction device, a frame member rigidly secured to the other respective ends of said draw bars, a hinge plate fixedly mounted on each of said draw bars adjacent said frame member, a pair of brackets each having an extension arm provided with a plurality of apertures, means pivotally connecting each of said brackets with one of said hinge plates, a tine supporting member rigidly secured to said brackets for pivotal action therewith, a plurality of spaced tines pivotally and detachably mounted on said tine supporting member, a rod having opposed ends complementing each of said arms, each of said rods having one of their respective ends selectively engaging within one of said apertures formed in their cooperating arms, a cross rod, means connecting said cross rod with the other of said ends of said rods, and means connected with said cross rod to effect rotation of said tine supporting member about its pivotal connection.

2. A dump rake as defined in claim 1, and a plurality of clearing rods rigidly secured to said frame member, and each of said rods extending between an adjacent pair of tines.

3. A dump rake comprising a pair of elongated, laterally spaced and substantially parallel draw bars, having opposed ends, means for detachably connecting the draw bars with a traction device, a frame member rigidly secured to the draw bars, a hinge plate fixed on each of the draw bars adjacent the frame member, a pair of brackets, means pivotally connecting each of the brackets with one of the hinge plates, a tine supporting member rigidly secured to the brackets for pivotal action therewith, a plurality of spaced tines mounted on the tine supporting member, a rod connected at one end with each of the brackets, a cross rod, means connecting said cross rod with the other ends of said rods, and means connected with the cross rod to effect rotation of the tine supporting member about its pivotal support.

CHARLES R. PEARSON.

REFERENCES CITED

The following references are of record in the file of this patent:

UNITED STATES PATENTS

| Number | Name | Date |
| --- | --- | --- |
| 597,919 | Stafford | Jan. 25, 1898 |
| 2,226,460 | Bristol et al. | Dec. 24, 1940 |
| 2,228,813 | Clendening | Jan. 14, 1941 |
| 2,366,234 | Blaydes | Jan. 2, 1945 |
| 2,475,908 | McCleskey | July 12, 1949 |